(12) United States Patent
Eastlack

(10) Patent No.: US 8,232,775 B2
(45) Date of Patent: Jul. 31, 2012

(54) LIMITATION OF VAMPIRIC POWER CONSUMPTION WITH DECOUPLING OF AN INDUCTIVE POWER APPARATUS AND AN ALTERNATING CURRENT POWER SOURCE

(75) Inventor: Jeffrey Raymond Eastlack, Austin, TX (US)

(73) Assignee: Vampire Labs, Austin, TX (US)

( * ) Notice: Subject to any disclaimer, the term of this patent is extended or adjusted under 35 U.S.C. 154(b) by 470 days.

(21) Appl. No.: 12/497,859

(22) Filed: Jul. 6, 2009

(65) Prior Publication Data
US 2010/0001684 A1    Jan. 7, 2010

Related U.S. Application Data

(60) Provisional application No. 61/078,365, filed on Jul. 4, 2008.

(51) Int. Cl.
*H02J 7/04* (2006.01)
*H02J 7/00* (2006.01)
*H02J 7/16* (2006.01)

(52) U.S. Cl. ........ 320/140; 320/128; 320/132; 320/134; 320/152; 320/157

(58) Field of Classification Search ............... 320/140
See application file for complete search history.

(56) References Cited

U.S. PATENT DOCUMENTS

| | | | |
|---|---|---|---|
| 7,183,748 B1 * | 2/2007 | Unno et al. | 320/136 |
| 7,622,898 B2 * | 11/2009 | Shimizu et al. | 320/166 |
| 2006/0119321 A1 * | 6/2006 | Wang et al. | 320/145 |
| 2008/0290731 A1 * | 11/2008 | Cassidy | 307/35 |
| 2011/0215768 A1 * | 9/2011 | Osada | 320/137 |

OTHER PUBLICATIONS

Green Plug, http://www.greenplug.us/ , p. 1, (Last Visited Jul. 9, 2009).
The Carphone Warehouse, Eco Charger Samsung, http://www.carphonewarehouse.com/phone-accessories/chargers-batteries/mains-chargers/buy/SAMSUNG-ECO-CHARGER;jsessionid=796E03F64DC0F98CA5A15 p. 1, (Last Visited Jul. 9, 2009).
Gadgets.CO.UK, Green Mobile Phone Charger, http://www.gadgets.co.uk/item/GREENCHARGER/Green-Mobile-Phone-Charger.html pp. 2, (Last Visited Jul. 9, 2009).
Good for You, Good for the Planet, http://www.gfy-gfp.com/eng/zero.html , pp. 4, (Last Visited Jul. 9, 2009).

* cited by examiner

*Primary Examiner* — Edward Tso
*Assistant Examiner* — Ahmed Omar
(74) *Attorney, Agent, or Firm* — Raj Abhyanker, P.C.

(57) ABSTRACT

Several methods and systems to perform limitation of vampiric power consumption with decoupling of an inductive power apparatus and an alternating current power source is disclosed. In an embodiment, an inductive battery charging system includes an inductive power apparatus that provides power to a target load when the inductive power apparatus is coupled to an alternating current power source. The system further includes an observation circuit to determine a power consumption associated with the target load, and a detection circuit to determine when a power consumption reaches a threshold level. The system also includes a separation circuit to decouple the inductive power apparatus and the alternating current power source when the power consumption is lower than a threshold level to limit vampiric power consumption of the inductive power apparatus.

19 Claims, 11 Drawing Sheets

LIMITATION OF VAMPIRIC POWER CONSUMPTION WITH DECOUPLING OF AN INDUCTIVE POWER APPARATUS AND AN ALTERNATING CURRENT POWER SOURCE

CLAIM OF PRIORITY

This application claims the benefit of U.S. Provisional Application No. 61/078,365, filed on Jul. 4, 2008.

FIELD OF TECHNOLOGY

This disclosure relates generally to battery charging technology, and in particular to limitation of vampiric power consumption with decoupling of an inductive power apparatus and an alternating current power source.

BACKGROUND

An inductive charging unit to charge a battery may consume vampiric power after a connected battery is charged to a target threshold. The inductive charging unit may consume the vampiric power regardless of whether the battery is coupled to the inductive charging unit. The consumption of the vampiric power by the inductive charging unit may contribute to an aggregate power waste of a household, a community, and/or a country. The consumption of the vampiric power may continuously occur while the inductive charging unit is coupled to an alternating current power source, and it may occur over the course of an hour, a day, and/or over a longer time period. The consumption of the vampiric power may result in an unnecessary generation of power by a power plant. Carbon pollution, nuclear waste, or other forms of pollution and waste may occur as a result of the unnecessary generation of power. In addition, the consumption of the vampiric power may incur a power cost during a peak use period, which may waste a financial resource and/or contribute to causing an insufficient supply of power.

A battery charging system to reduce the vampiric power consumed by an inductive charging unit coupled to a linked power socket may deactivate a linked power socket when a control power used by a control power socket falls below an active use limit. The linked power socket may be deactivated regardless of whether the inductive charging unit is coupled to an insufficiently charged battery. The battery charging system may therefore fail to charge the battery to a desired target level, and the battery may fail to provide power to a device and/or system at a critical moment. In addition, the use of the battery charging system may be reduced due to the failure to charge the battery, and the battery charging system may therefore fail to limit an additional consumption of vampiric power.

SUMMARY

Systems and methods of limitation of vampiric power consumption with decoupling of an inductive power apparatus and an alternating current power source are disclosed. In an aspect, an inductive battery charging system includes an inductive power apparatus that provides power to a target load when the inductive power apparatus is coupled to an alternating current power source. The system also includes an observation circuit to determine the power consumption associated with the target load and a detection circuit to determine when a power consumption reaches a threshold level. The system further includes a separation circuit to decouple the inductive power apparatus and the alternating current power source when the power consumption is lower than a threshold level to limit vampiric power consumption of the inductive power apparatus.

The separation circuit may maintain a coupling of the inductive power apparatus and the alternating current power source when the power consumption is greater than the threshold level. The system may include a transformer of the inductive power apparatus to inductively generate an electric current. The system may further include a rectification circuit of the inductive power apparatus and a voltage regulation circuit of the inductive power apparatus.

The observation circuit may include an amplifier circuit adapted to amplify a voltage across a sense resistor. The sense resistor may be coupled in series with the target load. In another embodiment, the observation circuit may include a hall probe current sensor. The hall probe current sensor may use less power use than a sense resistor.

The detection circuit may include a comparator circuit and/or a microcontroller. The comparator circuit may further include an additional amplifier. The separation circuit may include an opto-coupled relay. The system may also include a bypass circuit to initiate a charging sequence by electrically coupling the alternating current power source and the inductive power apparatus when a bypass input is detected.

The system may include a mechanical interface of the bypass circuit to close a switch when the bypass input is detected by the mechanical interface. The bypass input may include an external force, and closing the switch may electrically couple the alternating current power source and the inductive power apparatus. The switch may open when the external force on the mechanical interface is lower than an interface limit. The mechanical interface may include a push button that is compressible by the external force.

In another aspect, an inductive battery charging system includes an inductive power apparatus that provides power to a target load when the inductive power apparatus is coupled to an alternating current power source. The system also includes an observation module to determine a power consumption associated with the target load. The system further includes a detection module to determine when a power consumption reaches a threshold level. In addition, the system includes a separation module to decouple the inductive power apparatus and the alternating current power source when the power consumption is lower than a threshold level to limit vampiric power consumption of the inductive power apparatus. The system further includes a bypass module to initiate a charging sequence by electrically coupling the alternating current power source and the inductive power apparatus when a bypass input is detected.

The separation module may maintain a coupling of the inductive power apparatus and the alternating current power source when the power consumption is greater than the threshold level. The system may include a transformer of the inductive power apparatus to inductively generate an electric current. The observation module may determine the power consumption associated with the target load using a sense resistor coupled in series with the target load. The separation module may include an opto-coupled relay. The system may include an interface of the bypass module to close a switch when the bypass input is detected by the interface. The bypass input may be generated by an external force, and closing the switch may electrically couple the alternating current power source and the inductive power apparatus.

In yet another aspect, an inductive battery charger method includes inductively generating an electric current using a transformer, a rectification circuit, and/or a voltage regulation circuit of the inductive power apparatus. The method further includes amplifying a voltage of a sense resistor and monitoring a power consumption associated with a target load and comparing the power consumption to a threshold level. The method further includes maintaining a coupling of an inductive power apparatus and an alternating current power source while the power consumption is greater than a threshold level. In addition, the method includes decoupling an inductive power apparatus and an alternating current power source when the power consumption is lower than the threshold level to limit vampiric power consumption of an inductive power apparatus. In the aspect, an opto-coupled relay is used to couple and decouple the alternating current power source and the inductive power apparatus.

The method may include detecting a bypass input using a mechanical interface. The bypass input may include an external contact. The method may include initiating a charging sequence by bypassing a relay to couple an alternating current power source and an inductive power apparatus and closing a switch in an alternating current power circuit in response to the external contact. The method may further include, responsive to a change in the external contact, opening the switch in the alternating current power circuit.

BRIEF DESCRIPTION OF THE VIEWS OF DRAWINGS

Example embodiments are illustrated by way of example and not limitation in the figures of the accompanying drawings, in which like references indicate similar elements and in which.

Other features of the present embodiments will be apparent from the accompanying Drawings and from the Detailed Description that follows.

DETAILED DESCRIPTION

Several methods and a system to perform determination of a field referencing pattern are disclosed. Although the embodiments have been described with reference to specific example embodiments, it will be evident that various modifications and changes may be made to these embodiments without departing from the broader spirit and scope of the various embodiments.

Figure 1:
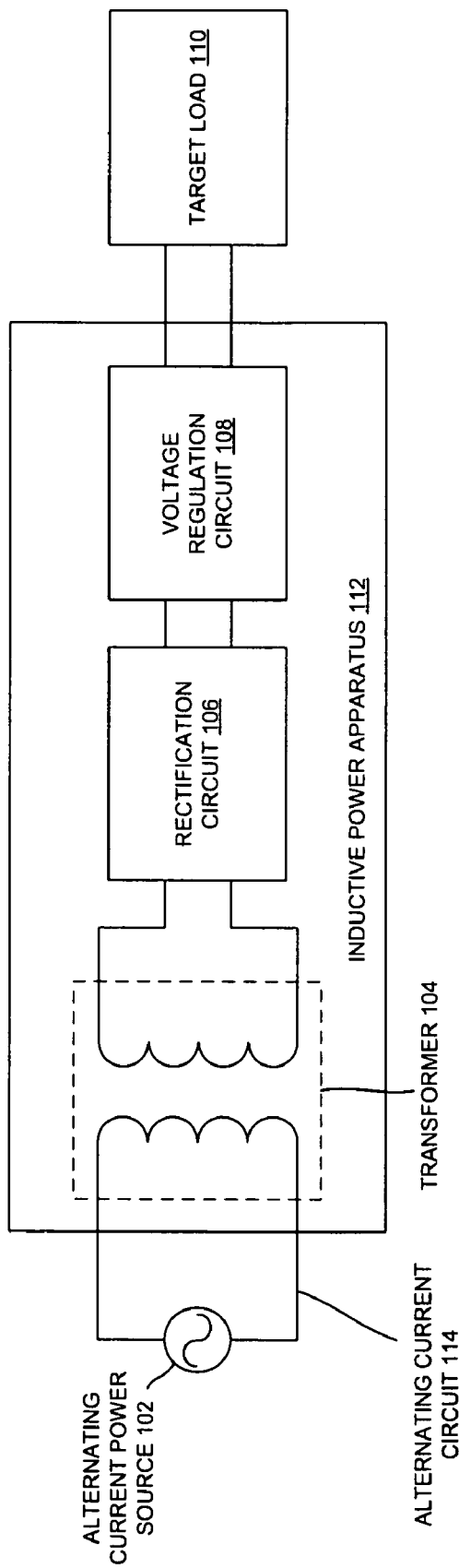
FIG. 1 is a schematic view of an inductive power apparatus, according to one embodiment.

FIG. 1 is a schematic view of an inductive power apparatus 112, according to one embodiment. In particular, FIG. 1 illustrates an alternating current power source 102, a transformer 104, a rectification circuit 106, a voltage regulation circuit 108, a target load 110, an inductive power apparatus 112, and an alternating current circuit 114.

In an embodiment, the alternating current power source 102 provides power to an inductive power apparatus 112 through a wall socket that is coupled to a power grid of an apparatus, a building, a city, and/or a larger power network. In the embodiment, the inductive power apparatus 112 includes a transformer 104, a rectification circuit 106, and a voltage regulation circuit 108. As illustrated in FIG. 1, the alternating current power source 102 may be coupled to the transformer 104 with an alternating current circuit 114. The transformer 104 may be coupled to the rectification circuit 106 and the voltage regulation circuit 108 in the inductive power apparatus 112. The inductive power apparatus 112 may further be coupled to the target load 110.

In the embodiment, the transformer 104 includes two conductively independent coils that are mutually coupled by magnetic flux when current flows in one of the coils. When alternating current flows in the primary coil a changing magnetic field may be produced within the transformer 104 core, which may then induce an electric current in the secondary coil as described by Faraday's law.

Vampire energy loss may occur when an electronic or mechanical machine consumes energy before or after the machine performs a useful task. Vampire energy loss may waste approximately 12% of the electric power production within the United States. One form of vampire energy loss may be "no load loss," in which energy may be lost even when the secondary coil of a transformer 104 is left open or is not attached to a load.

"No load loss" may be attributed to eddy currents and magnetic hysteresis within the transformer core. In addition, a direct current power supply may also incur dynamic and/or static power loss within a rectification circuit 106 and/or a voltage regulation circuit 108. These and other losses may contribute substantially to vampire energy loss. Another form of energy loss may include "parasitic loading," which may occur during a battery charging operation after a battery has been charged. "Parasitic loading" is further discussed with respect to FIG. 7.

In the embodiment, the target load 110 may be comprised of a battery, which may be one or more of various battery types. For example, the battery may be a wet cell or a dry cell battery. In addition, the battery may be one or more of a lead-acid battery, a nickel-cadmium battery, a nickel metal hydride battery, a lithium-ion cell, or any other type of rechargeable battery. The target load 110 may include a device and/or apparatus that may or may not include a battery, such as a laptop, a cell phone, a mobile device, etc.

Figure 2:
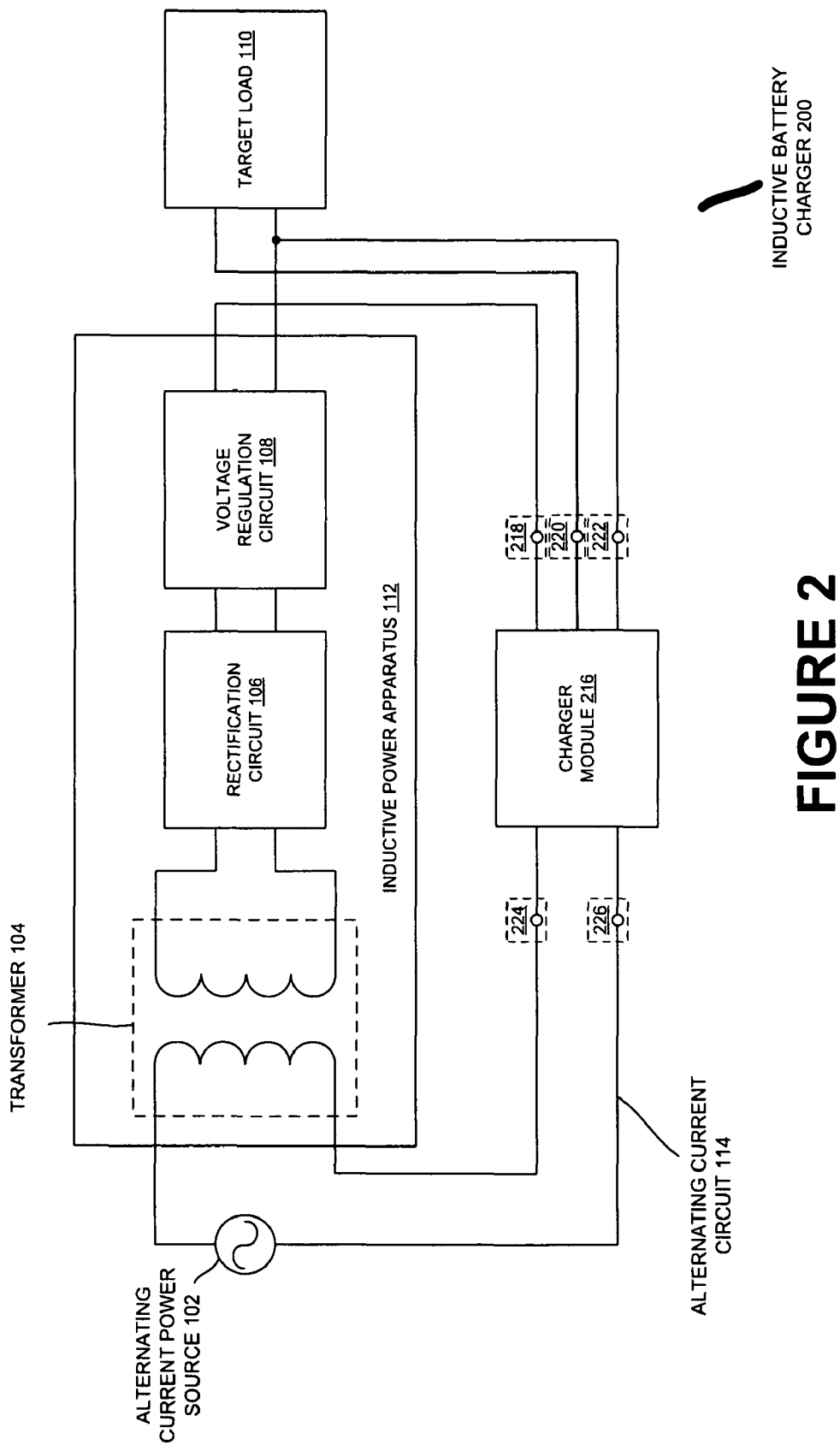
FIG. 2 is a schematic view of an inductive battery charger, according to one embodiment.

FIG. 2 is a schematic view of an inductive battery charger 200, according to one embodiment. In particular, FIG. 2 illustrates an alternating current power source 102, a transformer 104, a rectification circuit 106, a voltage regulation circuit 108, a target load 110, an inductive power apparatus 112, an alternating current circuit 114, an inductive battery charger 200, a charger module 216, and connections 218, 220, 222, 224, and 226.

As illustrated in FIG. 2, the charger module 216 may be coupled to the transformer 104 and the alternating current power source 102 through connections 224 and 226 in the alternating current circuit 114. The charger module 216 may be coupled to the voltage regulation circuit 108 and the target load 110 through connections 218, 220, and 222. In the present embodiment, the inductive battery charger 200 includes the inductive power apparatus 112 and the charger module 216.

Figure 7:
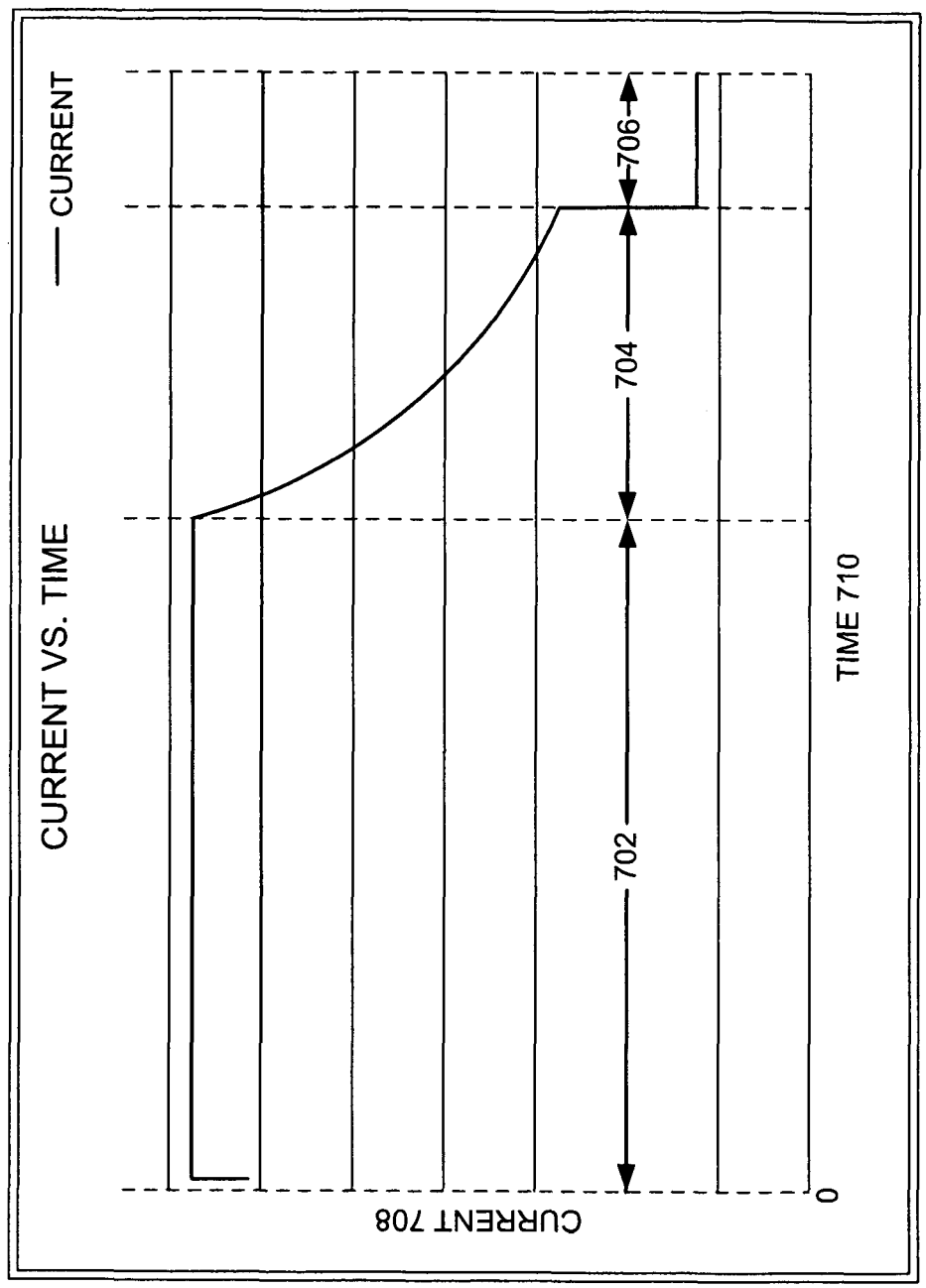
FIG. 7 is an illustration of a current draw characterization to charge a mobile device battery, according to one embodiment.

In one embodiment, the inductive battery charger 200 may operate in accordance with a power usage characteristic of a charging battery, which may be illustrated by the current vs. time plot of FIG. 7. The inductive battery charger 200 may cut alternating current power to the inductive power apparatus 112 once the charger module 216 determines that a battery of the target load 110 has been charged to a target threshold level. The charger module 216 may cut alternating current power when the determination occurs.

In the present embodiment, when the alternating current power is cut off from the inductive power apparatus 112, the charger module 216 may also undergo a "self disconnect" in which the charger module 216 may lack power from the inductive power apparatus 112. The charger module 216 may or may not include a charger module battery to allow the module to continue monitoring the target load after the "self disconnect" operation.

In the embodiment, when the alternating current power is cut off from the inductive power apparatus 112, a source of "no load loss" from the transformer 104 may be limited or prevented. In addition, cutting off the alternating current power may limit or prevent energy loss from static and/or dynamic power consumption of the rectification circuit 106 and/or the voltage regulation circuit 108.

In another embodiment, the charger module 216 may be modularly designed so that it may be integrated into future charger designs and/or adapted to an existing charger. For example, in FIG. 2, the charger module may be integrated with an existing design of an inductive power apparatus 112, according to the present embodiment.

Figure 6:
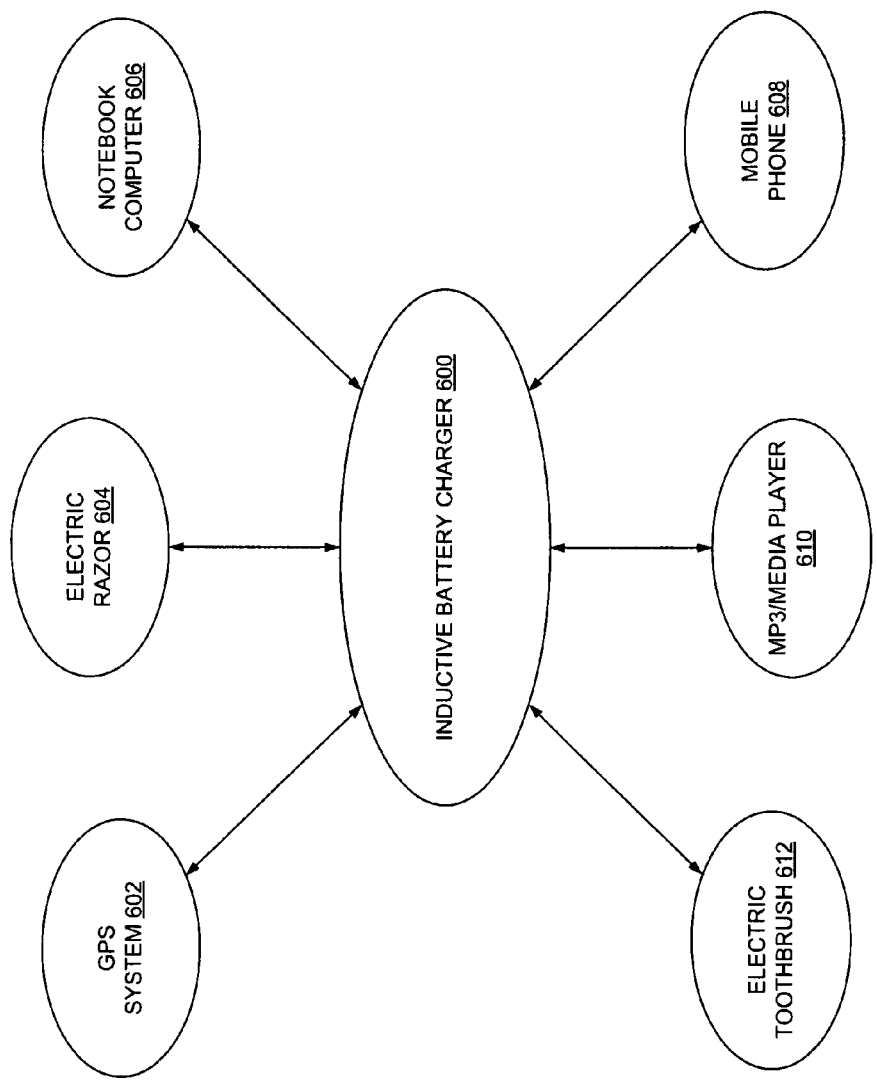
FIG. 6 is a system diagram of various devices that may be powered by the inductive battery charger, according to one embodiment.

In yet another embodiment, a charging operation to limit vampiric power consumption may begin when a target load 110 is coupled to the inductive battery charger 200 and the alternating current power source 102. A push button switch of the inductive battery charger 200 may be used to initiate a charging operation of the target load 110. In an embodiment, the charger module 216 then takes control of the inductive power apparatus 112. The charger module 216 then monitors the charge status of the battery. Based on the battery status, the charger module 216 determines whether to continue to allow alternating current power to be coupled to the inductive battery charger 200 components or to electrically disconnect the inductive battery charger 200 from the alternating current power source 102. The inductive battery charger 200 may be electrically disconnected from the alternating current power source 102 once the battery is charged to a desired target level. In other embodiments, the charger module 216 is made up of analog control circuits, which may be better understood from FIGS. 3 and 4. In multiple embodiments, the inductive battery charger 216 may be used to power a variety of portable devices, mobile devices, and other electrically powered devices or systems. Some example devices are illustrated in FIG. 6.

Figure 3:
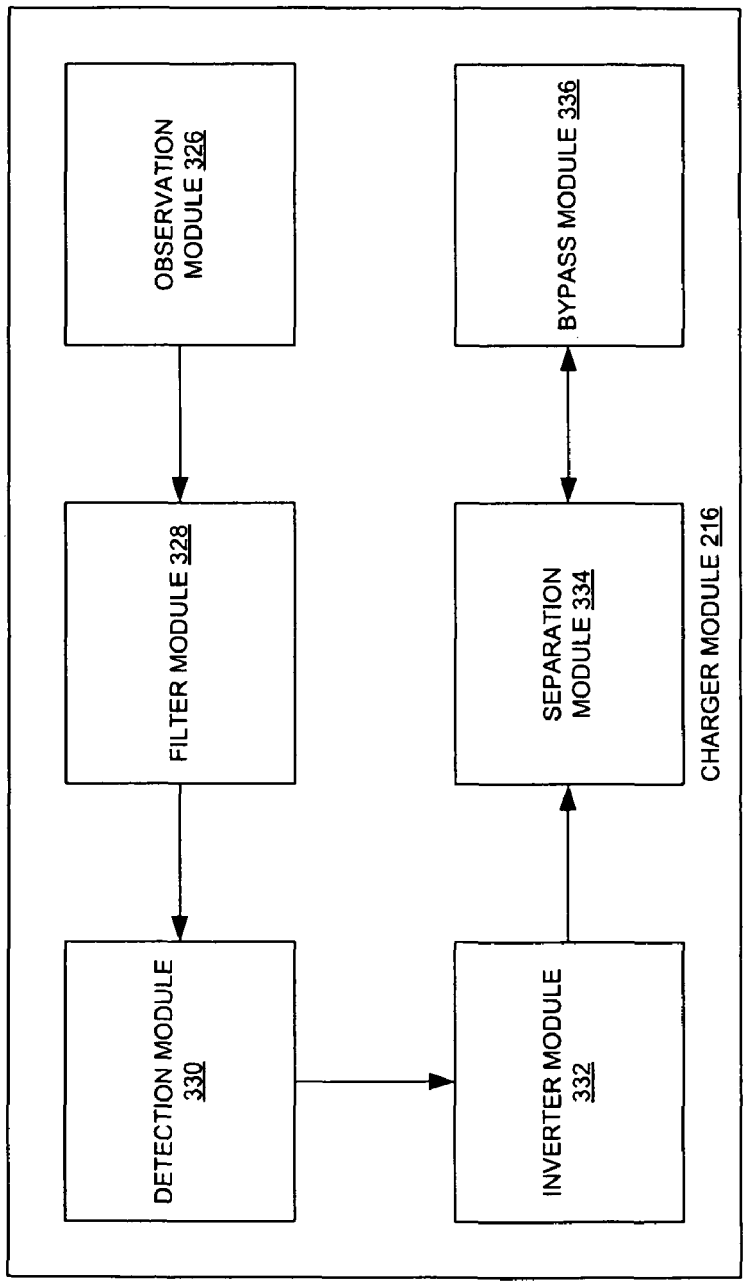
FIG. 3 is an exploded view of a charger module, according to one embodiment.

FIG. 3 is an exploded view of a charger module 216, according to one embodiment. In particular, FIG. 3 illustrates an observation module 326, a filter module 328, a detection module 330, an inverter module 332, a separation module 334, and a bypass module 336. In an embodiment, the modules may be circuits, including an observation circuit, a filter circuit, a detection circuit, an inverter circuit, a separation circuit, and/or a bypass circuit.

In one embodiment, the inductive power apparatus 112 provides direct current power to a target load 110 when the inductive power apparatus 112 is coupled to the alternating current power source 102. In the present embodiment, the observation module 326 determines a power consumption associated with the target load 110, and the detection module 330 determines when a power consumption reaches a threshold level. The separation module 334 decouples the inductive power apparatus 112 and the alternating current power source 102 when the power consumption is lower than a threshold level to limit vampiric power consumption of the inductive power apparatus 112.

Figure 4:
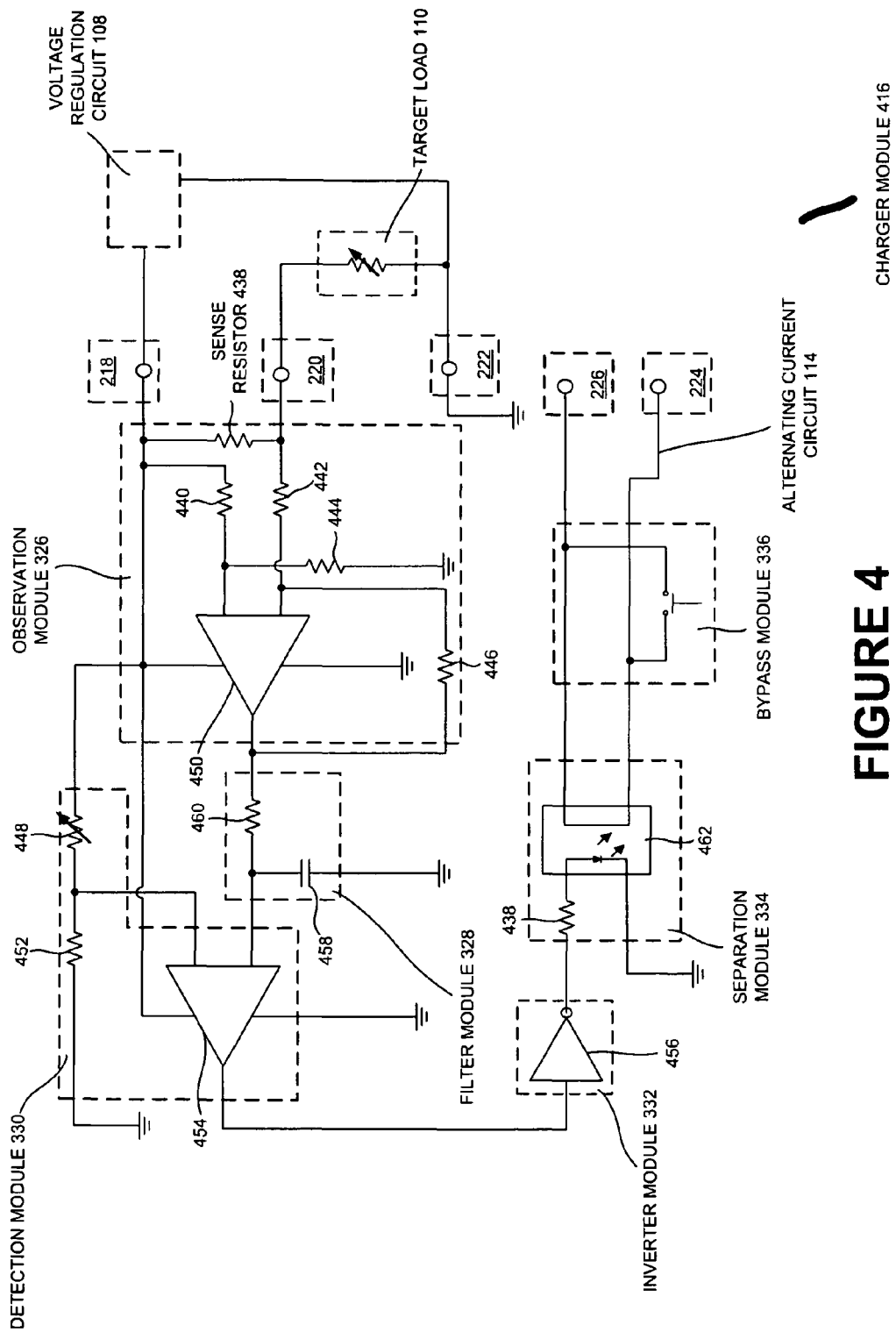
FIG. 4 is an exploded schematic view illustrating the charger module, according to one embodiment.

FIG. 4 is an exploded schematic view illustrating the charger module 216, according to one embodiment. In particular, FIG. 4 illustrates a voltage regulation circuit 108, a target load 110, an alternating current circuit 114, connections 216, 218, 220, 222, 224, an observation circuit 326, a filter circuit 328, a detection circuit 330, an inverter circuit 332, a separation circuit 334, a bypass circuit 336, according to the embodiment. The embodiment further includes a charger module 416, a sense resistor 438, resistors 440, 442, 444, and 446. The charger module 416 may use analog circuits rather than software that operates using a processor 902 and a memory (e.g., a main memory 904, a static memory 906). In other embodiments, the components of the charger module 416 may include circuit elements and/or software elements.

In an embodiment, the observation module 326 includes a differential amplifier, which uses an operational amplifier 450 with a particular arrangement of resistors 440, 442, 444, and 446. The differential amplifier senses and amplifies the voltage difference across a sense resistor 438, which is placed in series with the target load 110 that can be electrically modeled as a varying resistor, according to the embodiment.

In an embodiment, based on one or more charging characterization experiments of a cell phone and various mobile devices, the current drawn while the target battery is being charged will vary in accordance with the state of the battery charge. For example, in an embodiment, the current drawn will remain approximately constant at the maximum level for a period of time before decaying. The current draw decay may occur linearly or nonlinearly, such as by decaying exponentially. The charging operation may be better understood from FIG. 7.

In the embodiment, as the target battery becomes charged, a sudden drop in the current drawn by the target battery may occur. The amplified output of the differential amplifier of the observation module 326 is fed into a filter module 328, which may include a low pass filter. The low pass filter may be composed of resistor 460 and capacitor 458.

In the present embodiment, the output signal of the filter module 328 is fed to an analog comparator circuit of a detection module 330. The analog comparator circuit may be composed of an additional operational amplifier 454, and resistors 452 and 448. Resistors 452 and 448 are arranged as a voltage divider with an output value that dictates the comparator's voltage threshold and is fed into a non-inverting input of the additional operational amplifier 454.

In the embodiment, the low pass filter of the filter module 328 conditions the signal between the differential amplifier of the observation module 326 and the comparator circuit of a detection module 330 to prevent a high frequency noise from prematurely crossing the voltage threshold of the analog comparator. The high frequency noise may otherwise generate a voltage level associated with a completed charging operation based on signal fluctuation. In other embodiments, circuitry and/or software may be used to determine whether a target voltage threshold has been crossed for a sufficient period of time to indicate that a sufficient charging level has been reached. For instance, a timing circuit and/or software instruction may delay or prevent transmission of a voltage to the comparator circuit that would cause the comparator circuit to change its output voltage before the target load 110 reached its desired charging state.

In the embodiment, the output of the comparator circuit of the detection module 330 is fed into an inverter of the inverter module 332. The inverter module 332 outputs a high voltage signal, which provides an operational current (e.g., "on current") to an internal LED of the opto-coupled relay 462 of the separation module 334 when the output of the voltage comparator of the detection module 330 is low.

In the embodiment, a current limiting resistor 464 is placed in series with the output of the inverter module 332 and the input of the opto-coupled relay 462 of the separation module 334 to keep the current level from exceeding the maximum current value of the relay's internal LED. When the output voltage of the low pass filter of the filter module 328 crosses the threshold of the comparator of the detection module 330, its output changes from low to high. The output is inverted by the inverter module 332 to provide a low voltage to the opto-coupled relay 462 of the separation module 334. The low voltage signal may provide an approximately zero voltage potential difference across the internal LED of the opto-coupled relay 462 of the separation module 334. The approximately zero voltage potential difference, which stops the necessary "on current" for closed switch operation of the opto coupled relay's 462 alternating current ports 208 and 210. The operation may be better understood by referring to FIG. 8.

In an additional embodiment, a bypass module 466 is used to provide an initial power to the charger module 216. The bypass module 466 may include a push button switch 502, which may be used to provide initial power to the charger module 216. The push button switch 502 once pressed bypasses the opto-coupled relay 462 and provides direct alternating current to the components of the inductive power apparatus, including the transformer 104, the rectification circuit 106, and the voltage regulation circuit 108. Providing direct alternating current to these components may provide power to the charger module 216, which may then provide the "on current" to the opto-coupled relay 462 of the separation module 334. Power may be provided to the separation module 334 within approximately several milliseconds of the pressing of the push button of the bypass module 466.

In an embodiment, when the opto-coupled relay 462 of the separation module 334 lacks the "on current," the connection between the alternating current power source 102 from the wall receptacle and the primary coil of the transformer 104 is electrically open. In the embodiment, the "on current" to the opto-coupled relay 462 couples the connections 208 and 210 on the charger module, allows alternating current power to be provided to the primary coil 104. The AC source will remain open until the push button switch 502 is pressed again as described in 806 for the next charging session.

In another embodiment, the output of the voltage divider of the observation module 326 is set by adjusting the variable resistor 448. The voltage divider is composed of resistors 452 and 448. This output sets the voltage threshold of the analog comparator of the detection module 330, and the output may be set to an amplified voltage level that is approximately equal to the lower current demand that is consistent with a charged battery. The operation of the charging operation may be better understood by referring to FIG. 7. The voltage cutoff threshold may be set to a level below a voltage associated with a charged battery, which may be below the lowest current level illustrated in FIG. 7.

Figure 5:
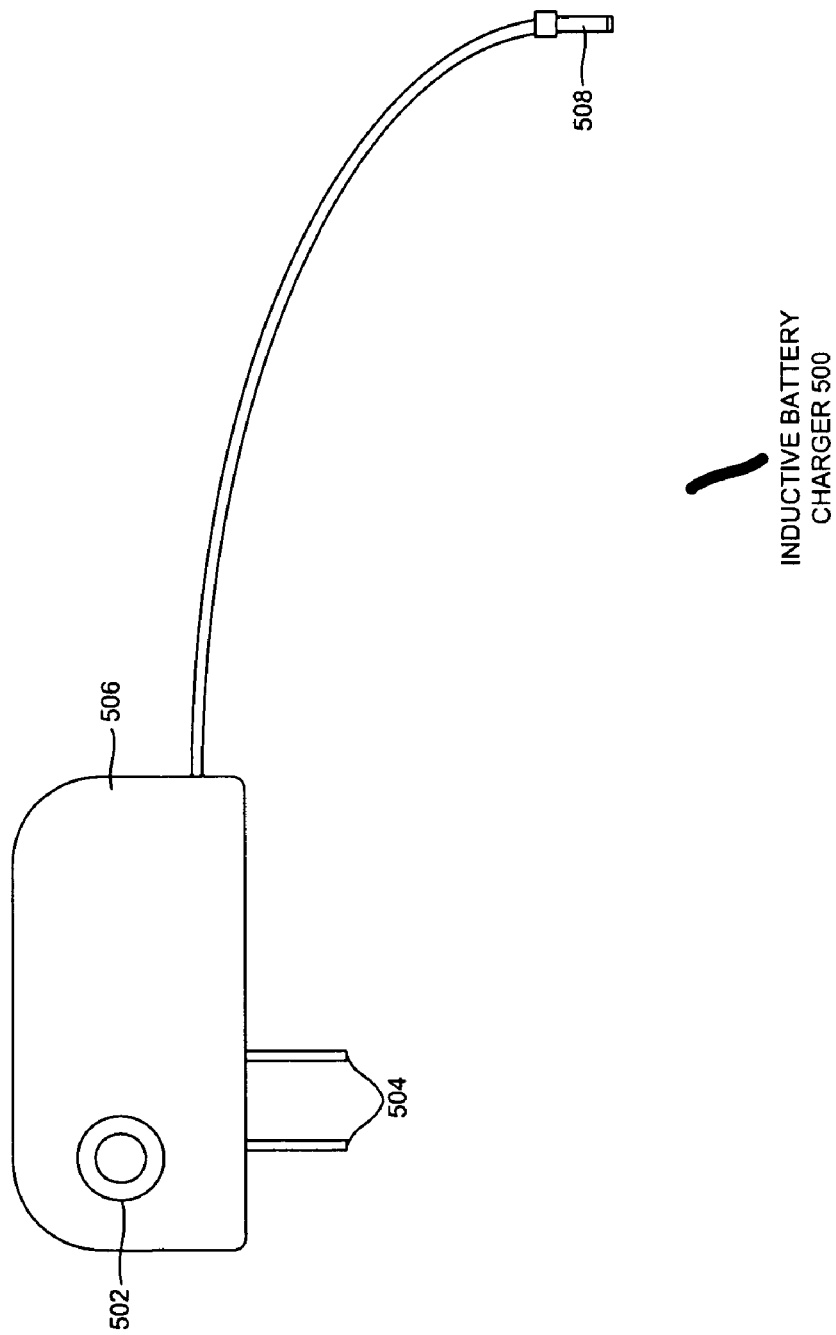
FIG. 5 is an illustration of an inductive battery charger, according to one embodiment.

FIG. 5 is an illustration of an inductive battery charger 500, according to one embodiment. In particular, FIG. 5 illustrates a push button switch 502, wall receptacle prongs 504, a charger enclosure 506, and a two port power and ground connector 508. Integration of the charger module 216 with an inductive power apparatus 112 may be internal to the charger enclosure 506. The alternating current power source may be coupled to the inductive battery charger 500.

FIG. 6 is a system diagram of various devices that may be powered by the inductive battery charger, according to one embodiment. In particular, FIG. 6 illustrates an inductive battery charger 600, a GPS system 602, an electric razor 604, a notebook computer 606, a mobile phone 608, an MP3/media player 610, and an electric toothbrush 612, according to one or more embodiments. The inductive battery charger 600 may include the same embodiments as the inductive battery charger 200 and 500. Each of the illustrated devices may include a battery that can be coupled to the inductive battery charger 600. Once a target battery coupled to the inductive battery charger 600 has been determined to have been charged, the inductive battery charger 600 may disconnect the alternating current power source 102 of the target device to limit vampiric energy loss associated with the inductive power apparatus 112.

FIG. 7 is an illustration of a current draw characterization to charge a mobile device battery, according to one embodiment. According to an embodiment, FIG. 7 shows the magnitude of the current drawn by the target load 110 over time through different states of charging and/or other electrical operation. In the present embodiment, the current drawn from the target load 110 (e.g., a battery) will be approximately constant at a maximum current draw, as illustrated in region 702 of FIG. 7. The current draw then decays exponentially as shown in region 704. In region 706, there may be a sudden current drop as the target load 110 becomes charged, and a residual parasitic current draw may occur in region 706.

In an embodiment, the inductive battery charger 200 may self-disconnect after the device battery has been charged and before a parasitic load can draw power. In the embodiment, by setting a cut off voltage threshold to a level below the current draw level for a charging battery of region 704 and above the parasitic current draw level of region 706, the inductive battery charger 200 may limit a loss of power due to the parasitic current draw while achieving a desired charging level of the target load 110.

In another embodiment, the current draw for a charging battery may be experimentally determined and used to adjust the comparator circuit of the detection module 330.

Figure 8:
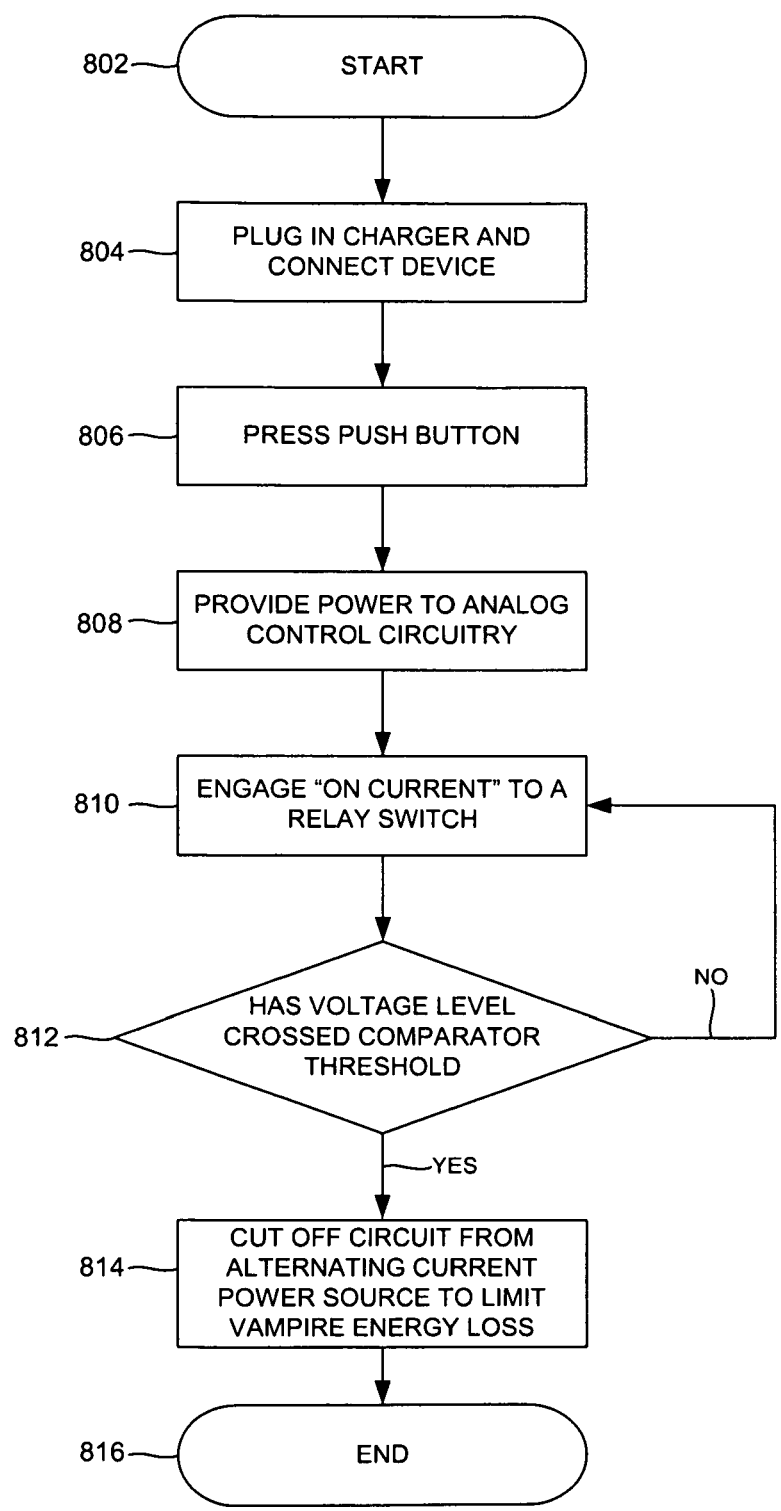
FIG. 8 is a flow chart that depicts operation of an inductive battery charger, according to one embodiment.

FIG. 8 is a flow chart that depicts operation of an inductive battery charger 200, according to one embodiment. In operation 802, a charging operation starts. In operation 804, a charger is plugged in to a socket coupled to an alternating current power source 102. In operation 806, a mechanical interface that includes a push button is compressed. In operation 808, power is provided to analog control circuitry of the charger module 216. In operation 810, an "on current" is engaged to a separation module 334 that includes a relay switch. In operation 812, the voltage is compared with the voltage level. If the voltage has not crossed the comparator threshold, the "on current" continues to be engaged. If the voltage level has crossed the comparator threshold, in operation 814, the circuit is cut off from an alternating current power source to limit vampiric energy loss. In operation 816, the process is ended.

Figure 9:
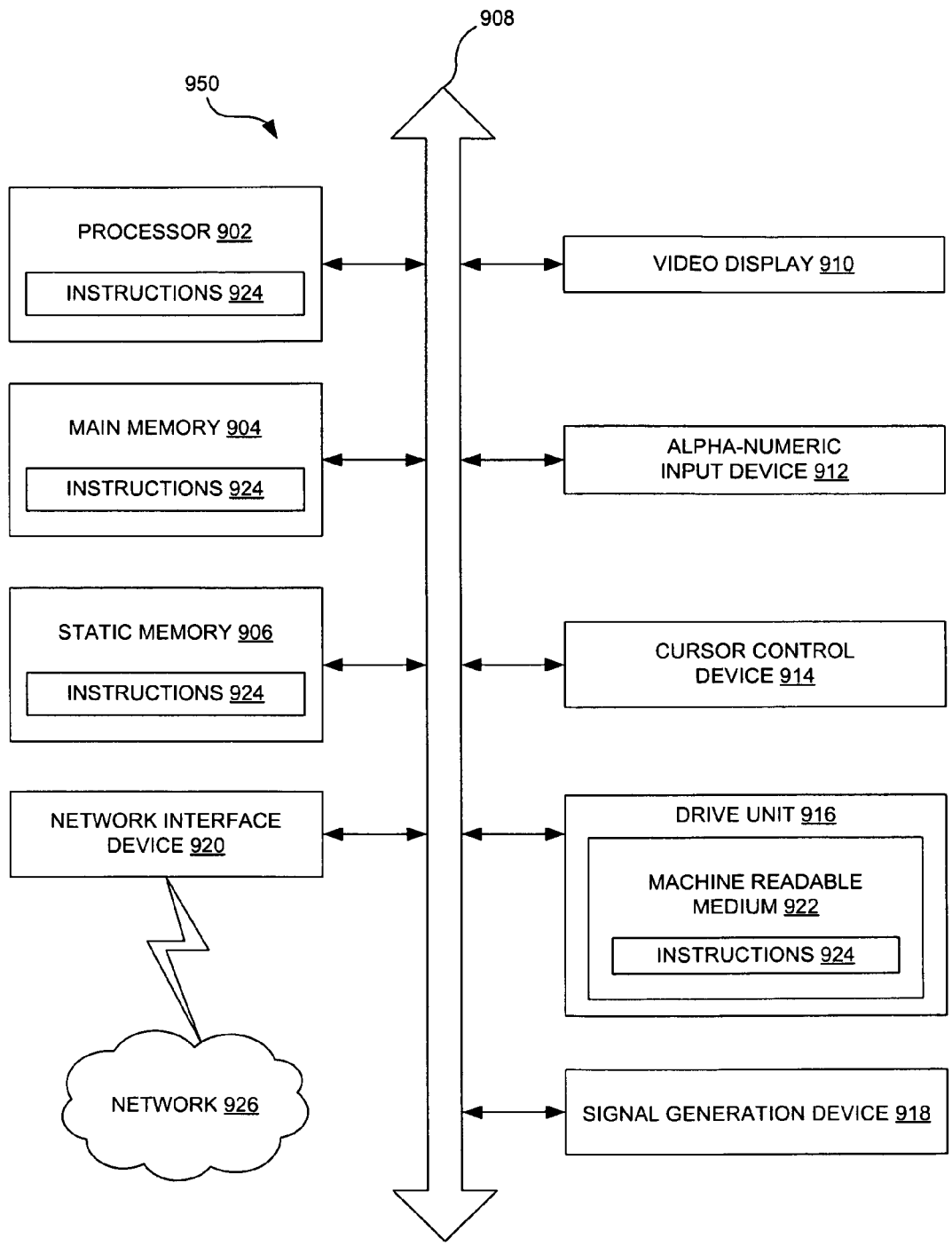
FIG. 9 is a diagrammatic system view of a data processing system that may be used with various embodiments disclosed herein, according to one embodiment.

FIG. 9 is a diagrammatic system view 950 of a data processing system that may be used with various embodiments disclosed herein. Particularly, the diagrammatic system view 950 of FIG. 9 illustrates a processor 902, a main memory 904, a static memory 906, a bus 908, a video display 910, an alpha-numeric input device 912, a cursor control device 914, a drive unit 916, a signal generation device 918, a network interface device 920, a machine readable medium 922, instructions 924, and a network 926, according to one embodiment.

The diagrammatic system view 900 may indicate a personal computer and/or the data processing system in which one or more operations disclosed herein are performed. The processor 902 may be a microprocessor, a state machine, an application specific integrated circuit, a field programmable gate array, etc. (e.g., Intel® Pentium® processor). The main memory 904 may be a dynamic random access memory and/or a primary memory of a computer system.

The static memory 906 may be a hard drive, a flash drive, and/or other memory information associated with the data processing system. The bus 908 may be an interconnection between various circuits and/or structures of the data processing system. The video display 910 may provide graphical representation of information on the data processing system. The alpha-numeric input device 912 may be a keypad, a keyboard and/or any other input device of text (e.g., a special device to aid the physically handicapped).

The cursor control device 914 may be a pointing device such as a mouse. The drive unit 916 may be the hard drive, a storage system, and/or other longer term storage subsystem. The signal generation device 918 may be a bios and/or a functional operating system of the data processing system. The network interface device 920 may be a device that performs interface functions such as code conversion, protocol conversion and/or buffering required for communication to and from the network 926. The machine readable medium 922 may provide instructions on which any of the methods disclosed herein may be performed. The instructions 924 may provide source code and/or data code to the processor 902 to enable any one or more operations disclosed herein.

Figure 10A:
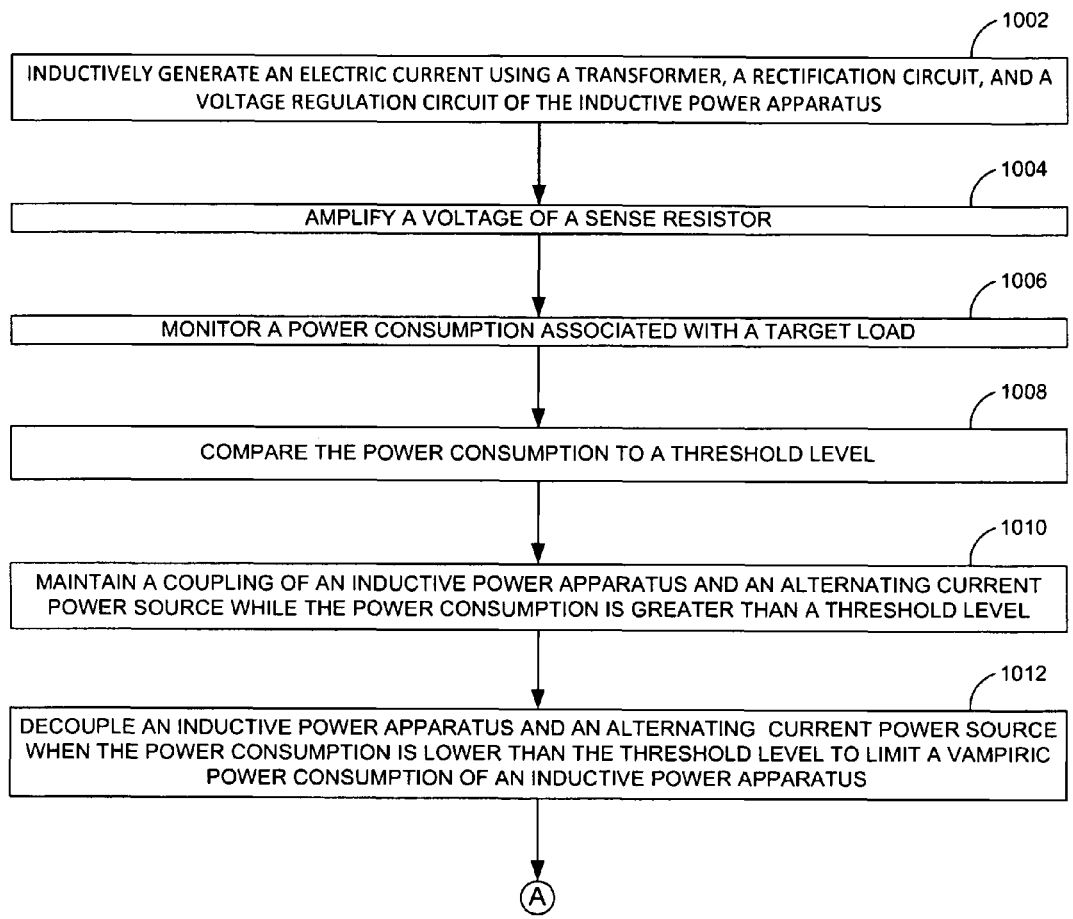
FIGS. 10A-10B illustrate a process flow to decouple an inductive power apparatus and an alternating current power source, according to one embodiment.
Figure 10B:
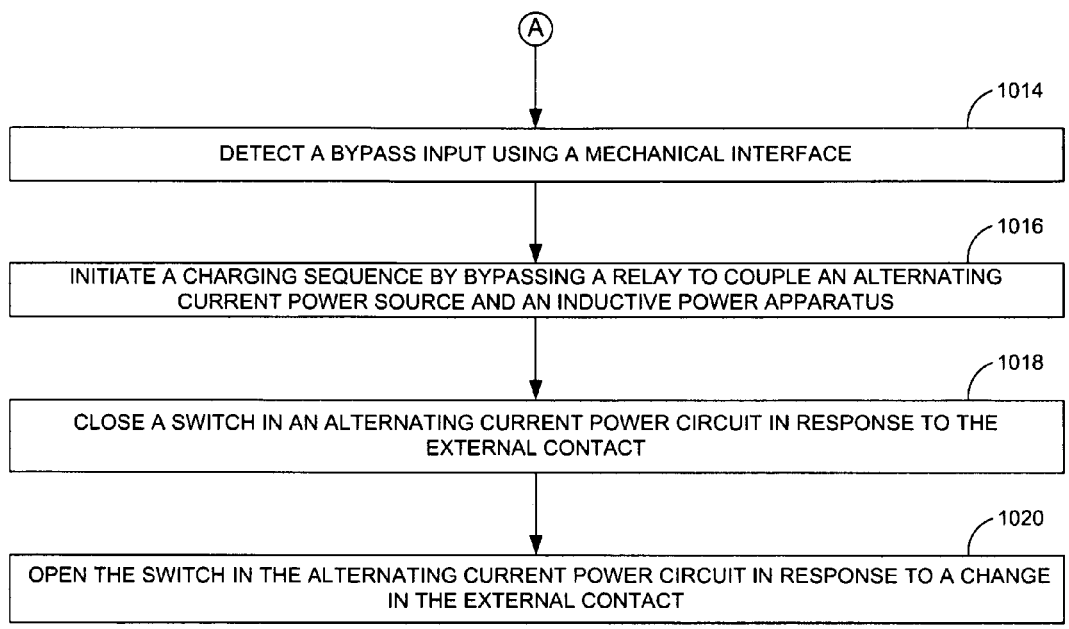

FIGS. 10A-10B illustrate a process flow to decouple an inductive power apparatus 112 and an alternating current power source 102, according to one embodiment. In operation 1002, an electric current is inductively generated using a transformer, a rectification circuit, and a voltage regulation circuit of the inductive power apparatus. In operation 1004, a voltage of a sense resistor is amplified. In operation 1006, a power consumption associated with a target load is monitored. In operation 1008, the power consumption is compared to a threshold level. In operation 1010, a coupling of an inductive power apparatus 112 and an alternating current power source 102 is maintained while the power consumption is greater than a threshold level. In operation 1012, an inductive power apparatus 112 and an alternating current power source 102 are decoupled when the power consumption is lower than the threshold level to limit vampiric power consumption of an inductive power apparatus 112. In operation 1014, a bypass input is detected using a mechanical interface. In operation 1016, a charging sequence is initiated by bypassing a relay to couple an alternating current power source 102 and an inductive power apparatus 112. In operation 1018, a switch in an alternating current power circuit is closed in response to the external contact. In operation 1020, the switch in the alternating current power circuit is opened in response to a change in the external contact.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software or any combination of hardware, firmware, or software (e.g., embodied in a machine readable medium). For example, the various electrical structure and methods may be embodied using transistors, logic gates, and electrical circuits (e.g., application specific integrated (ASIC) circuitry or in Digital Signal Processor (DSP) circuitry).

Particularly, the charger module 216, the observation module 326, the filter module 328, the detection module 330, the inverter module 332, the separation module 334, the bypass module 336 of FIGS. 2 and 3 may be enabled using software and/or using transistors, logic gates, and electrical circuits (e.g., application specific integrated circuitry, analog circuitry, programmable logic devices, microprocessors, etc.) such as a charger circuit, an observation circuit, a filter circuit, a detection circuit, an inverter circuit, a separation circuit, a bypass circuit, and other circuits.

In addition, it will be appreciated that the various operations, processes, and methods disclosed herein may be embodied in a machine-readable medium or a machine accessible medium compatible with a data processing system (e.g., a computer system), and may be performed in any order (e.g., including using means for achieving the various operations). Accordingly, the Specification and Drawings are to be regarded in an illustrative rather than a restrictive sense.

What is claimed is:

1. An inductive battery charging system, comprising:
an inductive power apparatus that provides power to a target load when the inductive power apparatus is coupled to an alternating current power source;
an observation circuit to determine a power consumption associated with the target load;
a detection circuit to determine when a power consumption reaches a threshold level;
a separation circuit to decouple the inductive power apparatus and the alternating current power source when the power consumption is lower than a threshold level to limit a vampiric power consumption of the inductive power apparatus; and
a bypass circuit to initiate a charging sequence by electrically coupling the alternating current power source and the inductive power apparatus when a bypass input is initiated.

2. The inductive battery charging system of claim 1, wherein the separation circuit maintains a coupling of the inductive power apparatus and the alternating current power source when the power consumption is greater than the threshold level.

3. The inductive battery charging system of claim 2, further comprising:
a transformer of the inductive power apparatus to inductively generate an electric current.

4. The inductive battery charging system of claim 3, further comprising:
a rectification circuit of the inductive power apparatus; and
a voltage regulation circuit of the inductive power apparatus.

5. The inductive battery charging system of claim 1, wherein the observation circuit is comprised of an amplifier circuit adapted to amplify a voltage across at least one of a sense resistor and a hall effect current monitoring device.

6. The inductive battery charging system of claim 5, wherein the sense resistor is coupled in series with the target load.

7. The inductive battery charging system of claim 1, wherein the detection circuit is comprised of a comparator circuit, and wherein the comparator circuit is comprised of an additional amplifier.

8. The inductive battery charging system of claim 7, wherein the separation circuit is comprised of an opto-coupled relay.

9. The inductive battery charging system of claim 1, further comprising:
   a mechanical interface of the bypass circuit to close a switch when the bypass input is detected by the mechanical interface, wherein the bypass input is comprised of an external force, and wherein closing the switch electrically couples the alternating current power source and the inductive power apparatus.

10. The inductive battery charging system of claim 9, wherein the switch is opened when the external force on the mechanical interface is lower than an interface limit.

11. The inductive battery charging system of claim 10, wherein the mechanical interface is comprised of a push button that is compressible by the external force.

12. An inductive battery charging system, comprising:
   an inductive power apparatus that provides power to a target load when the inductive power apparatus is coupled to an alternating current power source;
   an observation module to determine a power consumption associated with the target load;
   a detection module to determine when a power consumption reaches a threshold level;
   a separation module to decouple the inductive power apparatus and the alternating current power source when the power consumption is lower than a threshold level to limit a vampiric power consumption of the inductive power apparatus; and
   a bypass module to initiate a charging sequence by electrically coupling the alternating current power source and the inductive power apparatus when a bypass input is detected.

13. The inductive battery charging system of claim 12, wherein the separation module maintains a coupling of the inductive power apparatus and the alternating current power source when the power consumption is greater than the threshold level.

14. The inductive battery charging system of claim 13, further comprising:
   a transformer of the inductive power apparatus to inductively generate an electric current.

15. The inductive battery charging system of claim 12, wherein the observation module determines the power consumption associated with the target load using a sense resistor coupled in series with the target load.

16. The inductive battery charging system of claim 15, wherein the separation module is comprised of an opto-coupled relay.

17. The inductive battery charging system of claim 16, further comprising:
   an interface of the bypass module to close a switch when the bypass input is detected by the interface, wherein the bypass input is generated by an external force, and wherein closing the switch electrically couples the alternating current power source and the inductive power apparatus.

18. An inductive battery charger method, comprising:
   inductively generating an electric current using a transformer, a rectification circuit, and a voltage regulation circuit of the inductive power apparatus;
   amplifying a voltage of a sense resistor;
   monitoring a power consumption associated with a target load;
   comparing the power consumption to a threshold level;
   maintaining a coupling of an inductive power apparatus and an alternating current power source while the power consumption is greater than a threshold level;
   decoupling an inductive power apparatus and an alternating current power source when the power consumption is lower than the threshold level to limit a vampiric power consumption of an inductive power apparatus, wherein an opto-coupled relay is used to perform at least one of coupling and decoupling the alternating current power source and the inductive power apparatus; and
   detecting a bypass input using a mechanical interface, wherein the bypass input is comprised of an external contact.

19. The inductive battery charger method of claim 18, further comprising:
   initiating a charging sequence by bypassing a relay to couple an alternating current power source and an inductive power apparatus;
   closing a switch in an alternating current power circuit in response to the external contact; and
   responsive to a change in the external contact, opening the switch in the alternating current power circuit.

* * * * *